Mar. 20, 1923. 1,448,988
R. B. STIPES ET AL
ANCHORING PLATE FOR WHEEL CHOCKS
Filed Oct. 29, 1921
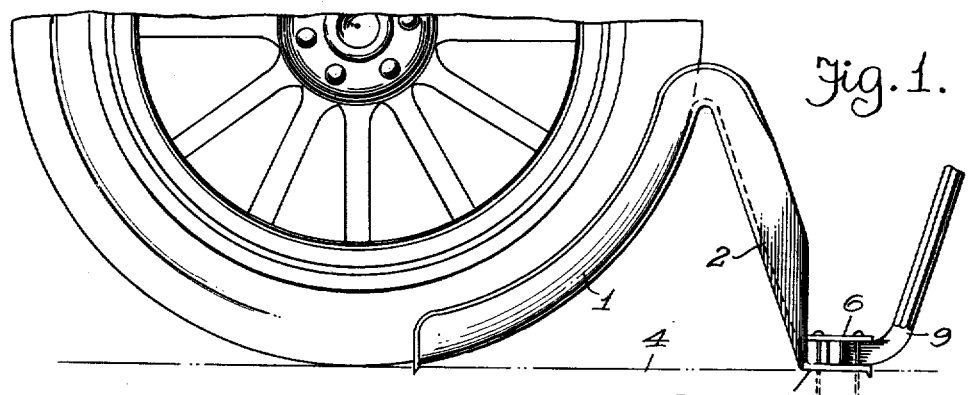
Fig. 1.
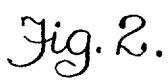
Fig. 2.
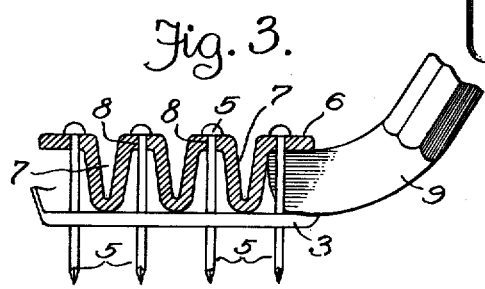
Fig. 3.
Fig. 8.
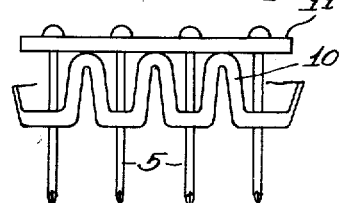
Fig. 4.
Fig. 9.
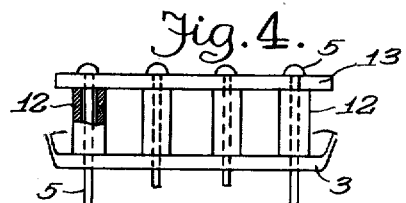
Fig. 5. Fig. 6.
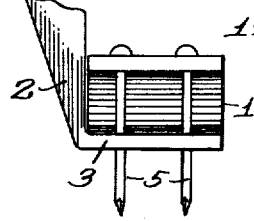
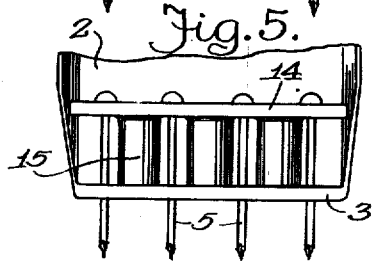
Fig. 7.
Inventors
Reuben B. Stipes,
John D. Goodwin,
Howard C. Welch,
By
Attorneys Patented Mar. 20, 1923.

1,448,988

UNITED STATES PATENT OFFICE.

REUBEN B. STIPES, JOHN D. GOODWIN, AND HOWARD C. WELCH, OF FLINT, MICHIGAN.

ANCHORING PLATE FOR WHEEL CHOCKS.

Application filed October 29, 1921. Serial No. 511,423.

*To all whom it may concern:*

Be it known that we, REUBEN B. STIPES, JOHN D. GOODWIN, and HOWARD C. WELCH, citizens of the United States of America, residing at Flint, in the county of Genesee and State of Michigan, have invented certain new and useful Improvements in Anchoring Plates for Wheel Chocks, of which the following is a specification, reference being had therein to the accompanying drawings.

In our pending application for patent filed October 11th, 1921, Ser. No. 416,006 there is disclosed a metallic chock and wheel holding device, which is substituted for an ordinary wooden chock or block for holding the wheel of an automobile or similar vehicle during transportation. The chock has a wheel engaging leg and a bracing leg which is spiked or otherwise secured to the floor of a car, and on account of the snug or flat engagement with the car floor, some difficulty is experienced in removing the spikes or leg holding means. The spikes cannot always be withdrawn in a straight manner and it is difficult to place a crow bar or other tool in place to draw the spikes. Furthermore, the car floor is ripped or torn, and it is only a matter of time until the railroad officials complain about the condition of the car floor. This is only one of the conditions encountered by the present method of securing our chocks, and we now aim to eliminate the objection by providing a novel anchoring plate, which may be advantageously used, without a material additional expense and with a saving of the car floor.

Our anchoring plate is supported in spaced relation to the foot of the bracing leg of the chock, with the spikes or fastening means passing therethrough, so that a crow bar or the like may be placed under the anchoring plate to pry the spikes or fastening means out of a car floor, or loosen the spikes to such an extent, as to be readily removable. The spacing of the anchoring plate relative to the leg foot may be attained either by the shape of the leg foot or by the shape of the anchoring plate, or members may be interposed.

The construction entering into our invention will be hereinafter described and then claimed, and reference will now be had to the drawing, wherein—

Figure 1 is a side elevation of the wheel chock provided with an anchoring plate and showing a crow bar or tool in position for moving the plate;

Fig. 2 is a plan of the wheel chock;

Fig. 3 is an enlarged cross-sectional view of the anchoring plate with a crow bar in position;

Fig. 4 is an end view showing spacer members between the chock foot and the anchor plate;

Fig. 5 is a similar view showing spacer members integral with the anchor plate;

Fig. 6 is a side elevation of same;

Fig. 7 is a plan of the lower face of the anchor plate provided with the spacing members;

Fig. 8 is an end view of a chock foot shaped to support the anchor plate, and

Fig. 9 is a side elevation of the same.

As pointed out in the beginning, our chock includes a wheel engaging leg 1 and a bracing leg 2, said bracing leg having a foot 3 which is ordinarily attached to a freight car floor 4 by spikes 5 and with the heads of the spikes engaging the foot 3 it is very difficult to withdraw the spikes, especially without injuring the floor.

Over the leg foot 3 we place an anchoring plate 6 and as shown in Fig. 3, said anchoring plate has a configuration which affords depending supports or spacer members 7 maintaining the greater part of the anchor plate 6 in spaced relation to the foot 3. The anchor plate 6 has openings 8 to receive the spikes 5 and with the plate 6 supported above the foot 3 the claw of a crow bar 9 or other tool can be inserted under the anchor plate and the plate pried or forced upwardly to withdraw the spikes 5 from the car floor. The spikes are withdrawn in a straight manner, may be used again, and the operation is rendered comparatively easy by the anchor plate permitting of the crow bar 2 obtaining a purchase for extracting the spikes.

As shown in Figs. 8 and 9 supports or spacer member 10 may form part of the leg foot 3 with an anchoring plate 11 resting on the spacer members 10.

In Fig. 4 we show that sleeve-like spacer members 12 may be placed between the foot 3 and an anchor plate 13, with the spikes 5 passing through the members 12 and maintaining the anchor plate 13 in spaced relation to the foot 3.

Again, in Figs. 5, 6 and 7, we show an anchor plate 14 having depending integral boss-like spacer members 15, and such protuberances may be also formed on the leg foot. We have shown many forms of spacer members for maintaining an anchor plate in spaced relation to the leg foot, and we do not care to confine our invention particularly to any of these forms, as other means may be devised for attaining the same result. If such means falls within the scope of the appended claims, we reserve the right to use the same.

What we claim is:—

1. A wheel chock which has a foot adapted to be secured to a floor so as to be easily removed therefrom, means for securing the chock foot to the floor, said means including spikes having heads, and an anchor plate through which said spikes extend, said plate being in spaced relation to said foot and under the head of the spike so a tool may be placed under said plate to extract the spikes.

2. Means for anchoring a wheel chock comprising a plate, members maintaining said plate in spaced relation to the chock, and fastening means extending through said plate adjacent said members.

3. Anchoring means as in claim 2 wherein said fastening means is engaged by said plate in a manner permitting of said plate moving said fastening means.

4. Means for anchoring a wheel chock comprising a plate, spacing means maintaining said plate in spaced relation to the chock, and fastening means extending through said plate adjacent said spacing means.

In testimony whereof we affix our signatures in presence of two witnesses.

REUBEN B. STIPES.
JOHN D. GOODWIN.
HOWARD C. WELCH.

Witnesses:
J. U. JONES,
W. O. REYNARD.